United States Patent [19]

Anzai et al.

[11] Patent Number: 4,745,159

[45] Date of Patent: May 17, 1988

[54] METHACRYLATE RESIN COMPOSITION AND PROCESS FOR ITS PREPARATION

[75] Inventors: Hisao Anzai; Hideaki Makino, both of Ohtake; Isao Sasaki, Hiroshima; Kozi Nishida; Masaru Morimoto, both of Ohtake, all of Japan

[73] Assignee: Mitsubishi Rayon Co., Ltd., Tokyo, Japan

[21] Appl. No.: 5,423

[22] Filed: Jan. 20, 1987

[30] Foreign Application Priority Data

Jan. 23, 1986 [JP] Japan ................... 61-10994
Oct. 30, 1986 [JP] Japan ................... 61-256958

[51] Int. Cl.$^4$ ............................................. C08F 8/30
[52] U.S. Cl. ................................ 525/329.9; 525/379
[58] Field of Search ................ 526/262; 525/329.9, 525/379

[56] References Cited

U.S. PATENT DOCUMENTS

| | | |
|---|---|---|
| 2,146,209 | 2/1939 | De Witt Graves . |
| 3,137,660 | 6/1964 | Jones . |
| 3,244,679 | 4/1966 | Schroder et al. . |
| 3,284,425 | 11/1966 | Schroder et al. . |
| 4,169,924 | 10/1979 | Barabas et al. .............. 525/377 |
| 4,246,374 | 1/1981 | Kopchik . |
| 4,415,706 | 11/1983 | Staas ........................... 525/183 |

FOREIGN PATENT DOCUMENTS

| | | |
|---|---|---|
| 0076691 | 4/1983 | European Pat. Off. . |
| 0200530 | 11/1986 | European Pat. Off. . |
| 0216505 | 4/1987 | European Pat. Off. . |
| 1308359 | 9/1962 | France . |
| 2393818 | 5/1978 | France . |
| 2528435 | 6/1982 | France . |
| 0505354 | 5/1939 | United Kingdom . |
| 0926269 | 5/1963 | United Kingdom . |
| 2101139 | 1/1983 | United Kingdom . |

*Primary Examiner*—Joseph L. Schofer
*Assistant Examiner*—N. Sarofim
*Attorney, Agent, or Firm*—Brumbaugh, Graves, Donohue & Raymond

[57] ABSTRACT

A methacrylate resin composition comprising a methacrylate resin containing methacrylimide units of the following formula:

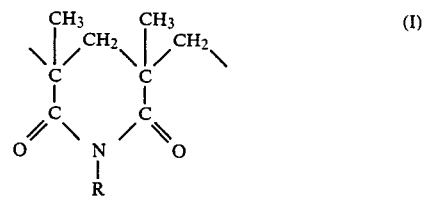

wherein R is a hydrogen atom or an aliphatic, alicyclic or aromatic hydrocarbon group having from 1 to 20 carbon atoms, and having a yellowness index (YIs) of at most 3 as measured in the form of a solution of the heated resin composition and a total light transmittance of from 89 to 95%.

15 Claims, 2 Drawing Sheets

METHACRYLATE RESIN COMPOSITION AND PROCESS FOR ITS PREPARATION

The present invention relates to a composition of a methacrylate resin containing methacrylimide units, and a process for its preparation.

Polymers composed of methacrylate esters such as methyl methacrylate (hereinafter referred to as methacrylate resins) are excellent not only in the transparency but also in the mechanical properties, weather resistance, etc. Therefore, they are used as high performance plastic optical fibers or decoration materials. In recent years, the optical fibers have been developed for applications in the fields of short distance optical communication, photosensors, etc. However, methacrylate resins do not have adequate heat resistance as is evident from the fact that the heat distortion temperature of polymethyl methacrylate is about 100° C. Therefore, the development for their applications has been restricted in many fields, and there has been a strong demand for improvement of the heat resistance.

As a method for improving the heat resistance of a methacrylate resin, it has been proposed, for example, to react a polymer of methyl methacrylate with a primary amine (U.S. Pat. No. 2,146,209 and West German Patent Nos. 1,077,872 and 1,242,369).

Further, there have been proposed a method wherein a polymer of a methacrylate ester is reacted with a water-soluble ammonium salt or an N-alkyl ammonium salt (U.S. Pat. No. 3,244,679), and a method wherein a polymer obtained by using a methacrylate ester, is reacted with a primary amine in an aqueous system (U.S. Pat. No. 3,284,425). Furthermore, a method has been proposed wherein a polymer of a methacrylate ester and ammonia or a primary amine are reacted by using an extruder (U.S. Pat. No. 4,246,374).

Methacrylate resins containing methacrylimide units (hereinafter sometimes referred to as methacrylimide resins) obtained by the above methods and their compositions, have improved heat resistance. However, they are inferior in the mechanical properties, optical properties, yellowing resistance or moldability, since they are poor in the transparency, the molecular weight of the methacrylate resin is likely to be substantially lowered, or the imidization tends to be non-uniform. Thus, they are not practically useful. Particularly in the field where a high level of transparencey is required, it has been difficult to obtain a practically useful methacrylimide resin composition.

For instance, in the process of U.S Pat. No. 2,146,209, the imidization is conducted in the presence of a single solvent or in the absence of any solvent. According to this process, it is possible to obtain a methacrylmide resin having improved heat resistance, but it is not possible to obtain a methacrylimide resin composition having excellent transparency and yellowing resistance (heat discoloration resistance).

U.S. Pat. No. 4,246,374 discloses imidization of a molten methacrylate resin in an extruder by a gaseous low molecular weight imidizing agent such as ammonia or methylamine. However, in this process, a low viscosity or gaseous imidizing agent is added to a highly viscous molten system, whereby the imidization tends to be non-uniform. Besides, the time for the imidization tends to be insufficient becasue of the use of the extruder. There will be a further problem such that the molecular weight of the methacrylate resin tends to be lowered. If the imidization is non-uniform and the time for the imidization is insufficient, it is impossible to obtain a methacrylimide resin composition having excellent transparency and yellowing resistance.

It is an object of the present invention to provide a methacrylimide resin composition having excellent heat resistance while maintaining the excellent optical properties, yellowing resistance, mechanical properties, weather resistance and moldability inherent to the methacrylate resin.

The present invention provides a methacrylate resin composition comprising a methacrylate resin containing methacrylimide units of the following formula:

wherein R is a hydrogen atom or an aliphatic, alicyclic or aromatic hydrocarbon group having from 1 to 20 carbon atoms, and having a yellowness index (YIs) of at most 3 as measured in the form of a solution of the heated resin composition and a total light transmittance of from 89 to 95%.

Further, the present invention provides a process for preparing a methacrylate resin composition comprising a methacrylate resin containing methacrylimide units of the formula I, which comprises reacting a resin comprising methyl methacrylate units as the main constituent units and having a methyl methacrylate dimer content of not higher than 1,000 ppm, with an amine of the formula $RNH_2$ wherein R is as defined above, under a condition such that said resin is dissolved in a solvent mixture for the resin.

Now, the present invention will be described in detail with reference to the preferred embodiments.

In the accompanying drawings.

As mentioned above, the methacrylimide resin composition of the present invention has a yellowness index (YIs) of at most 3, preferably from 0.1 to 1, as measured in the form of a solution of the heated resin composition, a yellowness index (YIp) of preferably at most 2.7, more preferably from 0.2 to 1.5, as measured in the form of a molded plate, and a total light transmittance of from 89 to 95%, preferably from 92 to 94%.

Such a methacrylimide resin composition can be obtained by a process characterized in that a methacrylate resin having a low methyl methacryalte dimer content is subjected to imidization in a mixture of solvents.

The methyl methacrylate dimer in this invention is a compound derived from two molecules of a methyl methacrylate monomer, which is formed as a by-product during the preparation of a polymer comprising methyl methacrylate units as the main constituent units. The composition of a methacrylate resin containing at least 2% by weight, preferably at least 10% by weight of methacrylimide units of the formula I, which is obtainable by reacting a methacrylate resin having such a methyl methacrylate dimer content of not higher than 1,000 ppm, preferably not higher than 250 ppm, with an amine of the formula RNH$_2$ wherein R is as defined above, in a solvent mixture under a specific condition, is superior in the transparency, particularly in the heat discoloration resistance.

If more than 1,000 ppm of the methyl methacrylate dimer is contained in the polymer comprising methyl methacrylate units as the main constituent units, this dimer reacts with the amine in the reaction step described hereinafter, to form a coloring substance made of a low molecular weight amide, and this coloring substance can hardly be separated from the methacrylimide resin in the step for separation of volatile substances. Accordingly, in order to obtain a methacrylimide resin composition having high transparency and minimun discoloration, intended by the present invention, it is important to minimize the content of the methyl methacrylate dimer in the methacrylate resin prior to the reaction with the amine.

The methacrylimide resin composition of the present invention can be obtained, for example, by adding the above-mentioned amine (which may be of a single kind, or a mixture of two or more different kinds) to a solution obtained by dissolving from 5 to 80 parts by weight of the above-mentioned methacrylate resin in a solvent mixture comprising from 19 to 94 parts by weight of an aromatic hydrocarbon and from 1 to 76 parts by weight of an aliphatic alcohol (the total amount of the methacrylic resin and the solvent mixture being 100 parts by weight), at a temperature of at least 100° C. and lower than 350° C., followed by stirring and mixing, and then separating volatile substances from the reaction product. If the solvent mixture is not used, it is impossible to obtain a methacrylimide resin composition having a low yellowness index as mentioned above.

The methacrylate resin containing methacrylimide units, is meant for a polymer with methacrylimide segments introduced into polymer side chains of a methacrylate resin.

The methacrylate resin to be empolyed in the present invention, includes a methyl methacrylate homopolymer or a copolymer of methyl methacrylate with other copolymerizable monomers such as acrylic esters, other methacrylate esters, acrylic acid, methacrylic acid, styrene or α-methyl styrene, which usually has an intrinsic viscosity of from 0.01 to 3.0 dl/g (at 25° C. in dimethylformamide). In such a case, other copolymerizable monomers are used in an amount of preferably not higher than 75% by weight based on the monomer mixture with methyl methacrylate. The acrylic esters include methyl acrylate, ethyl acrylate, butyl acrylate, cyclohexyl acrylate, 2-ethylhexyl acrylate and benzyl acrylate, and the methacrylate esters include ethyl methacrylate, butyl methacrylate, cyclohexyl methacrylate and benzyl methacrylate. These momomers may be used alone or in a combination of two or more different kinds.

The production of the methacrylimide resin composition of the present invention may be divided into two steps, i.e. the reaction step and the step for separating volatile substances, as mentioned above. The reaction step is a step wherein the methacrylate resin and the amine of the formula RNH$_2$ are reacted under the specific condition to induce a condensation reaction among the polymer side chains of the methacrylate resin. The step for separating volatile substances is a step wherein volatile substances composed mainly of the solvent mixture, are separated from the reaction product containing the imidized methacrylate resin formed in the reaction step. In the reaction step, the amine of the formula RNH$_2$ is dissolved into a solution of the methacrylate resin in the above-mentioned solvent mixture, and reacted with the resin. The solvents are required not to adversely affect the imidization which is a condensation reaction among the polymer side chains. They are also required not to affect methyl methacrylate or methacrylate ester segments in the case of a partial-imidization.

As such solvents, there may be mentioned mixtures of at least two different types selected from the group consisting of alcohols, particularly aliphatic alcohols such as methyl alcohol, ethyl alcohol, propyl alcohol, isopropyl alcohol, butyl alcohol and isobutyl alcohol; aromatic hydrocarbons such as benzene, toluene, xylene; and ketone or ether compounds such as methyl ethyl ketone, tetrahydrofuran and dioxane. Among them, a mixture of benzene, toluene, xylene or a mixture thereof, and an aliphatic alcohol such as methyl alcohol, ethyl alcohol, propyl alcohol, isopropyl alcohol, butyl alcohol or isobutyl alcohol, is preferred.

These solvents are used preferably after filtration by a porous membrane for purification, in order to obtain a methacrylimide resin composition having excellent transparency.

The smaller the amount of the solvent mixture, the better, from the viewpoint of the productivity. However, if the amount is too small, the effects of the solvent mixture as mentioned above tend to be low. Therefore, the amount of the solvent mixture is preferably within a range of from 20 to 80% by weight relative to the polymer concentration.

In order to obtain a methacrylimide resin composition having excellent transparency and low yellowness indexes (YIs, YIp), the above-mentioned imidization has to be conducted in the presence of a solvent mixture capable of dissolving the above-mentioned mathacrylate resin starting material, the amine of the formula RNH$_2$ and the formed methacrylimide resin. If the imidization is conducted in a non-dissolved condition or in the absence of a solvent, it is likely that a part of the methacrylate resin starting material is imidized, and the rest remains unimidized. Namely, the product will be a mixture of the methacrylate resin starting material and the methacrylimide resin, whereby it is impossible to obtain a resin composition having excellent transparency.

If a solvent capable of dissolving only the methacrylate resin starting material, for example, an aromatic hydrocarbon such as benzene, toluene or xylene, is used alone, the resulting methacrylimide resin will not dissolve in such a solvent, whereby it is difficult to uniformly obtain a methacrylimide resin having a high imidization rate. Likewise, if a poor solvent to the methacrylate resin starting material, such as methanol, or an aliphatic alcohol which is poorer as a solvent than the aromatic hydrocarbon, is used alone as a solvent, the imidization will not proceed uniformly. Besides, the imidization will not be complete. Thus, a discolored methacrylimide resin composition having a high yellow index will be formed.

Whereas, when a solvent mixture obtained by mixing at least two types of solvents is used as mentioned above, the above problems disappear, and it is possible to obtain a methacrylimide resin composition having high transparency and dicoloration resistance. Among the amines represented by the formula RNH₂ used in the process of the present invention, those wherein R is an aliphatic hydrocarbon group, include methylamine, ethylamine and propylamine. However, it is also possible to use compounds capable of producing such amines under heating, such as 1,3-dimethylurea, 1,3-diethylurea and 1,3-dipropylurea, or ammonia and urea.

As amines wherein R is an aromatic hydrocarbon group, aniline, toluidine and trichloroaniline may be mentioned. As an amine wherein R is an alicyclic hydrocarbon group, cyclohexyl amine may be mentioned.

These compounds are used in such an amount that the methacrylimide units of the formular I will be contained in an amount of at least 2% by weight. For instance, they may be employed within a range of from 0.01 to 20 mols relative to 1 mol of methyl methacrylate momomer units of the methacrylate resin.

The reaction of the methacrylate resin with the amine in the reactor may be conducted at a temperature of at least 100° C. and less than 350° C., preferably at least 150° C. and less than 300° C. If the reaction temperature is lower than 100° C., the imidization tends to be slow. If the temperature exceeds 350° C., a decomposition reaction of the methacrylate resin starting material takes place concurrently. There is no particular restriction as to the reaction time. From the viewpoint of the productivity, the reaction time is preferably short, and is usually from 30 minutes to 5 hours. The reaction pressure is determined depending upon the type of the amine, the reaction temperature and the imidization rate.

Any reactor may be employed for the preparation of the methacrylimide resin composition of the present invention so long as the object of the present invention can be accomplished without hindrance. However, in order to conduct the imidization uniformly and to obtain a uniform polymer containing mathacrylimide units, it is preferred to employ a tank-type reactor provided with an inlet, an outlet and a stirring device and adapted to provide a mixing function throughout the interior of the reactor. In the step for separating volatile substances, the majority of volatile substances will be separated and removed from the reaction product of the methacrylate resin and the imidizing agent. The content of the volatile substances remaining in the methacrylimide resin composition is finally reduced to a level of not higher than 1% by weight, preferably not higher than 0.1% by weight. The removal of the volatile substances can be conducted by using a usual vent extruder or devolatizer, or may be conducted by an another method such as a method wherein the reaction product is diluted with a solvent, and then precipitated in a large amount of a non-solvent, followed by the filtration and drying of the precipitates.

In the process of the present invention, it is preferred to add a small amount of an antioxidant to prevent a decrease of the molecular weight due to the radical depolymerization of the methacrylate resin starting material under a high temperature reaction condition. The antioxidant for this purpose includes a phosphite type antioxidant such as tricresyl phosphite, cresylphenyl phosphite, trioctyl phosphite or tributoxyethyl phosphite, a hindered phenol type antioxidant such as hydroquinone, cresol or a phenol derivative, an amine type antioxidant such as naphthylamine, phenylenediamine or a hydroquinoline derivative, an alkylmercaptan and a dialkylsulfide derivative.

Further, other additives such a plasticizer, lubricant, a ultraviolet absober, a coloring agent or pigment, may be incorporated to meet the requirments for the properties of the product.

Figure 1:
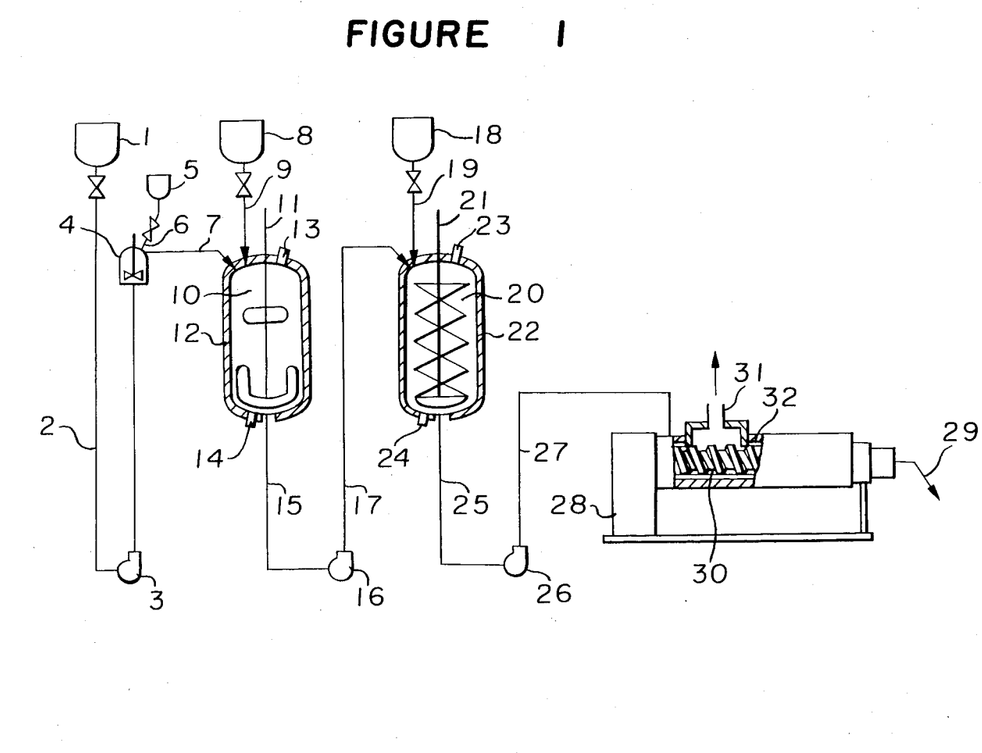
FIG. 1 is a diagrammatic view of an apparatus to be used for the reaction to produce the methacrylimide resin composition of the present invention.

Now, a typical apparatus to be used for the production of the methacrylimide resin composition of the present invention, will be described with reference to FIG. 1.

An inert solvent mixture from a solvent reservoir 1 passes through a line 2, and is sent to a solvent supply tank 4 by a pump 3. An antioxidant which may be added as the case requires, is supplied from an antioxidant reservoir 5 via a line 6 to the solvent supply tank 4 and dissolved in the solvent mixture, which is then sent to a resin dissolving tank 10. On the other hand, the resin is supplied from a pellet reservoir 8 via a line 9 to the resin dissolvi,ng tank 10. The resin dissolving tank 10 is provided with a stirrer 11 and a jacket 12. In the jacket, a heating medium is circulated through openings 13 and 14. The dissolved resin in the resin dissolving tank 10 is supplied via a line 15, a pump 16 and a line 17, to a reaction tank 20, and reacted therein with an imidizing agent supplied from an imidizing agent reservoir 18 via a line 19. The reaction tank 20 is provided with a spiral ribbon type stirrer 21 and jacket 22. In the jacket, a heating medium is circulated through openings 23 and 24. The reaction product in the reactor 20 is sent via a discharge line 25, a pump 26 and a line 27, to a volatile substance separator 28, wherein a volatile component is removed, and the polymer composition is discharged from a polymer outlet 29. The volatile substance separator 28 is provided with a screw 30, a vent 31 and a heating means 32.

Now, the present invention will be described in detail with reference to Examples and Reference Examples. However, it should be understood that the present invention is by no means restricted to these specific Examples. In the following description, "parts" and "%" mean "parts by weight" and "% by weight" respectively, except for the case of the total light transmittance. The apparatus in FIG. 1 had the following specification.

Resin dissolving tank: 500 liters
Reaction tank: 40 liters
Volatile substance separator:
Single screw vented extruder
    Screw: 30 mm in diameter×720 mm in length
    Length of the vent: 60 mm In the Examples, the properties of the polymer starting materials and the resulting resin compositions, were measured by the following methods.

(1) The infrared absorption spectrum was measured by a KBr disk method by means of an infrared spectrophotometer (285 Model, Manufactured by Hitachi, Limited).

(2) The intrinsic viscosity of the polymer was determined by measuring the flow time (ts) of a dimethylformamide solution containing 0.5% by weight of the tested polymer and the flow time (to) of the dimethylformamide at a temperature of 25+0° C. by means of Deereax-Bishoff viscometer, then obtaining the relative viscosity η rel of the polymer from the ts/to value and then calculating the intrinsic viscosity by the following equation:

$$\text{Intrinsic viscosity} = (\ln \eta \text{rel}/C)_{c \to 0}$$

wherein C is the amount of the polymer by grams per 100 ml of the solvent.

(3) The heat distortion temperature was measured in accordance with ASTM D648.

(4) The melt index of a polymer was obtained in accordance with ASTM D1238 (grams for 10 min. at 230° C. under a load of 3.8 kg).

(5) The imidization rate (%) of the polymer was determined from the nitrogen content obtained from the elemental analysis (measuring device: CHN coder (MT-3), manufactured by Yanagimoto Seisakusho K.K.) and from the measurement by a proton NMR JNM-FX-100 (JEOL) spectrometer 100 MHz, whereby the weight of the imide ring units relative to the total amount of the imide ring units and the methyl methacrylate units, was shown by "%".

(6) The transparency was measured in accordance with ASTM D1003-61 after the obtained resin composition was molded by heat-pressing to have a thickness of 2 mm.

(7) The yellowness index (YIs) as measured in the form of a solution of the heated resin composition, was obtained in accordance with JIS K-7103. Namely, pellets of the obtained methacrylimide resin composition was heated in air at 150° C. for 15 days, and then dissolved to obtain a 15 wt % methylene chloride solution, and then the yellowness index (YIs) was measured with a transmitted light in accordance with the above method and represented as the yellowness index under heating. YIs is calculated by the following equation.

$$YIs = \frac{100(1.28 X - 1.06Z)}{Y}$$

X, Y and Z: tristimulus values of a test sample or a test piece with standard lights.

Further, by using the same molded plate as obtained in (6), the molded plate was heated in the same manner as mentioned above to 150° C. for 15 days, whereupon the discoloration of the molded plate by heating was visually evaluated.

No substantial change: O
Slightly yellowed: Δ
Yellowed: X (8) The yellowness index (YIp) of a molded plate was determined by molding the obtained polymer pellets into a flat plate having a thickness of 2 mm and a size of 80×80 mm by means of a 5 ounce injection molding machine (SAV-30, manufactured by Meiki Seisakusho K.K.), and then measuring the yellowness index by the transmitted light of the flat plate.

Molding condition:
Cylinder temperature: 290° C.
Molding cycle: 60 sec.

YIp was calculated by the following equation.

$$YIp = \frac{100(1.28X - 1.06Z)}{Y}$$

X, Y and Z: tristimulus values of a test sample or a test piece with standard lights (9) Method for measuring a methyl methacrylate dimer The methacrylate resin comprising methyl methacrylate as the main component, was dissolved in an acetone solvent, and the dimer was measured by gas chromatography.

The temperature of the column during the measurment was 150° C.

REFERENCE EXAMPLE

Preparation of a methacrylate resin containing methyl methacrylate dimer

Figure 2:
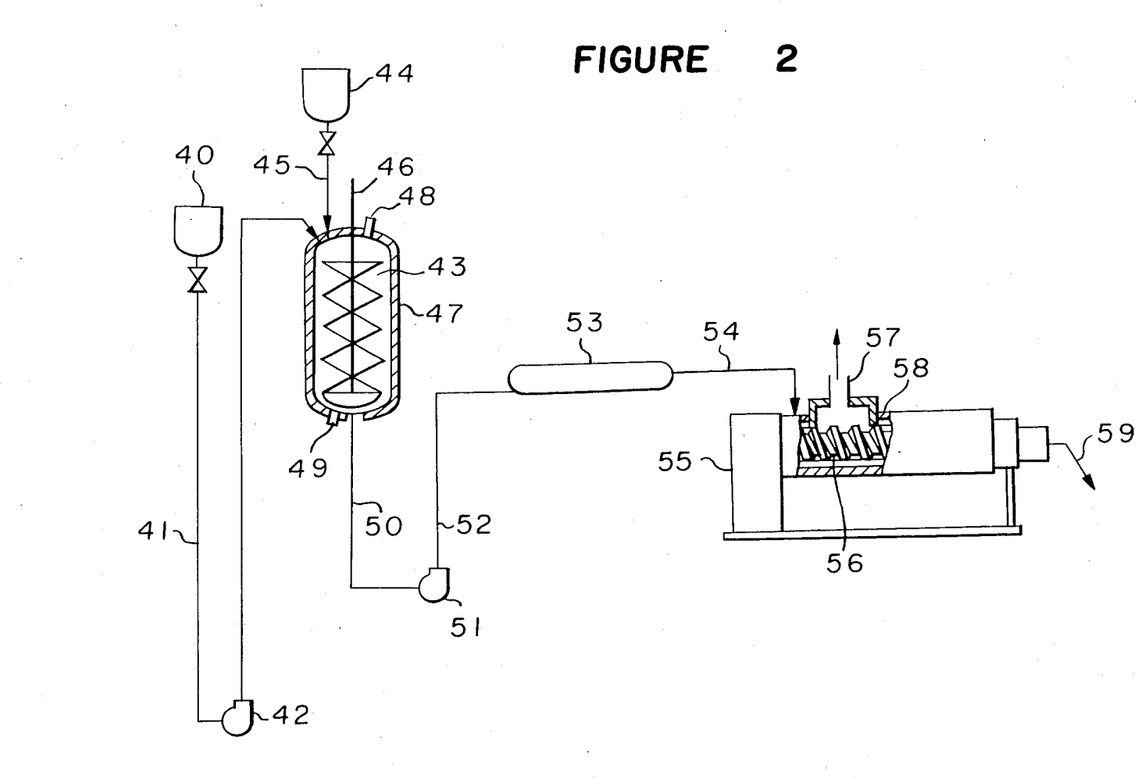
FIG. 2 is a diagrammatic view of an apparatus to produce a methacrylate resin.

A typical apparatus to be used for the preparation of various methyl methacrylate polymers, will be described with reference to FIG. 2.

A mixture comprising 100 parts of a methyl methacrylate monomer, 0.0017 part of di-tert-butylperoxide as the polymerization initiator, 0.25 part of dodecylmercaptan and from 0 to 50 parts of a non-polymerizable solvent (such as toluene), is charged to a reservoir 40, and supplied via a line 41 by a pump 42 at a flow rate of 3 kg/hr (as the monomer content) to a polymerization reaction tank 43. If necessary, an additive such as an antioxidant may be supplied from an additive reservoir 44 via a line 45 to the reaction tank 43. The reaction tank 43 is provided with a spriral ribbon-type stirrer 46 and a jacket 47. In the jacket, a heating medium is circulated through openings 48 and 49. This reaction tank has an internal capacity of 25 liters, and the polymerization reaction temperature is variable within a range of from 60° to 190° C. The conversion (monomer to polymer) in this polymerization is variable within a range of from 40 to 70%. The methyl methacrylate polymer syrup formed in the polymerization reaction tank 43 is passed through a line 50, a pump 51, a line 52 and a syrup heater 53, whereby the syrup is heated to a temperature of from 200° to 240° C. Then, the syrup is sent via a line 54 to a volatile substance separator 55. Here, volatile substances such as an unreacted methyl methacrylate monomer and in some cases a non-polymerizable solvent such as toluene or the methyl methacrylate dimer are partially removed at a vent portion temperature of from 190° to 250° C. under a reduced pressure of from 3 to 500 mm Hg. The methyl methacrylate dimer here is meant for a by-product formed in the polymerization reaction tank 43 or in the syrup heater 53. The formed methyl methacrylate polymer is discharged from the polymer outlet 59 in the form of a strand, and processed into pellets by e.g. a cutting machine. The volatile substance separater 55 is provided with a screw 56, a vent 57 and a heating means 58.

The volatile substance separater here had the following specification.
Single screw vented extruder
Screw: 30 mm in diameter and 720 mm in length
Length of the vent: 60 mm In the methacrylate resin thus obtained, a methyl methacrylate dimer is contained. The amount of such dimer is variable depending upon the polymerization condition (such as the amount of the solvent used, the polymerization temperature and the conversion) and the syrup heating temperature and the volatile substance separating ability. In the following Examples and Comparative Examples, analytical values wil be used as the contents of the methyl methacrylate dimer.

EXAMPLE 1

Into a 500 liter dissolving tank, 100 parts of an adequately dried methyl mathacrylate polymer (methyl methacrylate dimer: 30 ppm, intrinsic viscosity: 0.51 dl/g) was introduced together with 90 parts of toluene dried and purified by filtration with a 0.1 μm fluoropore (manufactured by Sumitomo Denki Kogyo K.K.) and 10 parts of methanol dried and purified with a 0.1 μm fluoropore, and the polymer was dissolved at 200° C. under stirring.

Then, this solution was continuously supplied to the reaction tank at a supply rate of 5 kg/hr (as resin content), and the internal temperature of the tank was adjusted to 230° C. while thoroughly mixing the solution under stirring at a rotational speed of 90 rpm. Then, dried methylamine was purified by filtration with a 0.1 μm fluoropore and continuously supplied to the reaction tank at a rate of 20 mol/hr, whereupon the internal pressure was adjusted to 45 kg/cm² (gauge pressure). The temperature in the reaction tank was maintained at 230° C. during the reaction, and an average retention time was 4.5 hours. The reaction product withdrawn from this reaction tank, was introduced into a 20 liter aging tank (not shown in FIG. 1), and aged under thorough stirring at a temperature in the aging tank of 230° C. for an average retention time of 2.0 hours. The aged product was continuously supplid to a vented extruder, and the volatile substances were separated. The temperature of the vented extruder was adjusted to 230° C. at the vent portion and to 230° C. at the extrusion portion, and the vacuum at the vent portion was adjusted to 9 mmHg abs'.

A strand extruded from the die was cooled with water and then cut to obtain a resin composition in the form of pellets having excellent transparency.

On the other hand, toluene, methanol and the unreacted amine discharged from the vent portion, were cooled and recovered. The infrared absorption spectrum of the resin composition thus obtained, was measured, whereby absorption specific to a methyl methacrylimide polymer was observed at wave numbers of 1720 cm$^{-1}$, 1663 cm$-1$ and 750 cm$^{-1}$.

Further, from the NMR spectrum, a signal corresponding to this structure was shown. The elemental analysis also indicated a nitrogen content of 8.3% (imidization rate=100%), thus indicating that the product was almost completely a N-methyl methacrylimide polymer. From the evaluation of the physical properties of the obtained resin (composition), the following properties were obtained.

Intrinsic viscosity: 0.48
Melt index: 1.5
Heat distortion temperature: 175° C.
Refractive index $\eta^D 25$: 1.530 (as measured by Abbe refractometer)

By using the pelletized resin composition thus obtained, a flat plate having a thickness of 2 mm and a size of 80×80 mm was molded by a 5 ounce injection molding machine (SAV-30, manufactured by Meiki Seisakusho K.K.), and the transparency was measured.

Total light transmittance: 94%
Parallel light transmittance: 93%
Haze: 1.0%

The pelletized resin composition was heated at 150° C. for 15 days in an atmosphere of air, and the yellowness index (YIs) was measured. The following initial value YI was obtained by measuring the yellowness index in the same manner except that the pelletized resin composition was not heated before dissolving it to form a 15 wt % methylene chloride solution.

Initial value YI=0.15
Heat discoloration degree of the molded plate: O
After heating YIs=0.4
Molded plate YIp=0.6

From the above measurements, it is evident that the methacrylimide resin composition in this Example has excellent transparency, and the change with time under heating is very small.

EXAMPLES 2 to 29

Various methacrylimide resin compositions were prepared in the same manner as in Example 1 by using methacrylate resins and amines as identified in Table 1.

The internal pressure of the reaction tank was maintained at a level of from 20 to 80 kg/cm² (gauge pressure). The reaction conditions and the properties of the resin compositions obtained are shown in Table 1.

In the Tables, the supply rate of the resin solution is shown as resin content.

TABLE 1

| | Methacrylate resin | Methyl methacrylate dimer (ppm) | Solvents (weight ratio) | Resin solution Concentration | Supply rate (kg/hr) | Imidizing agent Type | Supply rate (mol/hr) | Transparency (total light transmittance) (%) |
|---|---|---|---|---|---|---|---|---|
| Example 2 | MMA polymer *1 | 50 | Toluene/methanol (90/10) | 30 | 2.7 | Methyl amine | 20 | 94 |
| Example 3 | MMA-MAA copolymer *2 | 950 | Toluene/methanol (90/10) | 20 | " | Methyl amine | " | 93 |
| Example 4 | MMA-MA copolymer *3 | 600 | Toluene/methanol (90/10) | 20 | " | Methyl amine | " | 93 |
| Example 5 | MMA-AA copolymer *4 | 350 | Toluene/methanol (90/10) | 30 | " | Methyl amine | " | 93 |
| Example 6 | MMA-BA copolymer *5 | 750 | Toluene/methanol (90/10) | 30 | " | Methyl amine | " | 93 |
| Example 7 | MMA-BMA-MAA copolymer *6 | 250 | Toluene/methanol (90/10) | 20 | " | Methyl amine | " | 93 |
| Example 8 | MMA-t-BA-t-BMA copolymer *7 | 370 | Toluene/methanol (90/10) | 30 | " | Methyl amine | " | 93 |
| Example 9 | MMA-t-BA copolymer *8 | 130 | Toluene/methanol (90/10) | 30 | " | Methyl amine | " | 93 |
| Example 10 | MMA-ST | 30 | Toluene/ | 30 | " | Methyl | " | 93 |

TABLE 1-continued

| | | | | | | | | |
|---|---|---|---|---|---|---|---|---|
| | copolymer *9 | | methanol (90/10) | | | amine | | |
| Example 11 | MMA-BZMA copolymer *10 | 50 | Toluene/ methanol (90/10) | 30 | 2.7 | Methyl amine | 20 | 93 |
| Example 12 | MMA-CHMA copolymer *11 | 70 | Toluene/ methanol (90/10) | 30 | " | Methyl amine | " | 93 |
| Example 13 | MMA polymer *12 | 30 | Toluene/ methanol (90/10) | 50 | 2.0 | Methyl amine | 0.15 | 94 |
| Example 14 | MMA polymer *12 | " | Toluene/ methanol (90/10) | 50 | " | Methyl amine | 1.0 | 94 |
| Example 15 | MMA polymer *12 | " | Toluene/ methanol (90/10) | 50 | " | Methyl amine | 5.0 | 94 |
| Example 16 | MMA polymer *12 | " | Toluene/ methanol (90/10) | 50 | " | Methyl amine | 10 | 94 |
| Example 17 | MMA polymer *12 | " | Toluene/ methanol (90/10) | 50 | " | Methyl amine | 25 | 94 |
| Example 18 | MMA polymer *12 | " | Toluene/ methanol (90/10) | " | " | Methyl amine | 30 | 94 |
| Example 19 | MMA polymer *12 | " | Toluene/ methanol (90/10) | " | " | Dodecyl amine | 20 | 94 |
| Example 20 | MMA polymer *12 | " | Toluene/ methanol (90/10) | " | " | Cyclo hexyl amine | " | 94 |
| Example 21 | MMA polymer | " | Toluene/ methanol (90/10) | " | " | N—butyl amine | " | 94 |
| Example 22 | " | " | Toluene/ methanol (90/10) | " | " | N—propyl amine | " | 94 |
| Example 23 | " | " | Toluene/ methanol (90/10) | " | " | Ammonia | 0.15 | 93 |
| Example 24 | " | " | Toluene/ methanol (90/10) | " | " | " | 1.0 | 93 |
| Example 25 | " | " | Toluene/ methanol (90/10) | " | " | " | 5.0 | 93 |
| Example 26 | " | " | Toluene/ methanol (90/10) | 50 | " | " | 10 | 93 |
| Example 27 | " | " | Toluene/ methanol (90/10) | " | " | " | 25 | 93 |
| Example 28 | " | " | Toluene/ methanol (90/10) | " | " | " | 30 | 93 |
| Example 29 | " | " | Toluene/ methanol (90/10) | " | " | " | 20 | 93 |

| | Heat yellowness index | | Yellowness index of molded plate YIp | Heat distortion temperature (°C.) | Imidization rate (%) |
|---|---|---|---|---|---|
| | YIs | Visual evaluation | | | |
| Example 2 | 0.7 | O | 1.0 | 177 | 98.5 |
| Example 3 | 2.7 | O | 2.6 | 175 | 98.5 |
| Example 4 | 1.9 | O | 2.0 | 173 | 97.0 |
| Example 5 | 0.8 | O | 1.7 | 175 | 97.0 |
| Example 6 | 2.3 | O | 2.5 | 159 | 73.0 |
| Example 7 | 1.0 | O | 1.5 | 160 | 77.0 |
| Example 8 | 1.2 | O | 1.7 | 163 | 78.0 |
| Example 9 | 1.0 | O | 1.3 | 159 | 77 |
| Example 10 | 0.5 | O | 0.9 | 155 | 70 |
| Example 11 | 0.4 | O | 1.1 | 175 | 97 |
| Example 12 | 0.6 | O | 1.2 | 173 | 96 |
| Example 13 | 0.4 | O | 0.8 | 115 | 12 |
| Example 14 | 0.3 | O | 0.8 | 135 | 45 |
| Example 15 | 0.5 | O | 0.8 | 155 | 65 |
| Example 16 | 0.5 | O | 0.8 | 165 | 75 |
| Example 17 | 0.5 | O | 0.9 | 179 | 98 |
| Example 18 | 0.4 | O | 1.0 | 187 | 100 |

TABLE 1-continued

|  |  |  |  |  |  |  |
|---|---|---|---|---|---|---|
|  | Example 19 | 0.5 | O | 0.7 | 135 | 100 |
|  | Example 20 | 0.5 | O | 0.7 | 137 | 100 |
|  | Example 21 | 0.5 | O | 0.7 | 145 | 100 |
|  | Example 22 | 0.4 | O | 0.7 | 163 | 100 |
|  | Example 23 | 0.3 | O | 0.9 | 121 | 11 |
|  | Example 24 | 0.3 | O | 0.9 | 135 | 25 |
|  | Example 25 | 0.4 | O | 1.0 | 197 | 75 |
|  | Example 26 | 0.4 | O | 1.1 | 215 | 88 |
|  | Example 27 | 0.5 | O | 1.1 | 215 | 90 |
|  | Example 28 | 0.5 | O | 1.1 | 225 | 92 |
|  | Example 29 | 0.5 | O | 1.1 | 217 | 90 |

*1: Methyl methacrylate polymer (intrinsic viscosity = 0.56)
*2: Methyl methacrylate-methacrylic acid copolymer (weight ratio = 95/5, intrinsic viscosity = 0.7)
*3: Methyl methacrylate-methylacrylate copolymer (weight ratio = 95/5, intrinsic viscosity = 0.35)
*4: Methyl methacrylate-acrylic acid copolymer (weight ratio = 95/5, intrinsic viscosity = 0.6)
*5: Methyl methacrylate-butylacrylate copolymer (weight ratio = 90/10, intrinsic viscosity = 1.0)
*6: Methyl methacrylate-butyl methacrylate-methacrylic acid copolymer (weight ratio = 90/5/5, intrinsic viscosity = 0.65)
*7: Methyl methacrylate-tert-butylacrylate-tert-butyl methacrylate copolymer (weight ratio = 95/5/5, intrinsic viscosity = 1.05)
*8: Methyl methacrylate-tert-butylacrylate copolymer (weight ratio = 95/5, intrinsic viscosity = 0.55)
*9: Methyl methacrylate-styrene copolymer (weight ratio = 80/20, intrinsic viscosity = 0.6)
*10: Methyl methacrylate-benzyl methacrylate copolymer (weight ratio = 90/10, intrinsic viscosity = 0.55)
*11: Methyl methacrylate-cyclohexyl methacrylate copolymer (weight ratio = 90/10, intrinsic viscosity = 0.6)
*12: Same as used in Example 1.

EXAMPLES 30 to 34

Various methacrylimide resin compositions were prepared in the same manner as in Example 1 by using methacrylate resins, amines and solvents as identified in Table 2.

The internal pressure of the reaction tank was maintained at a level of from 40 to 80 kg/cm² (gauge pressure), and the purification of the solvents was conducted in the same manner as in Example 1. The reaction conditions and the properties of the resin compositions thus obtained, are shown in Table 2.

COMPARATIVE EXAMPLES 1 to 11

The same operation as in Example 1 was repeated except that the content of the methyl methacrylate dimer in the methacrylate resin and the solvent were changed as identified in Table 3. The properties of the methacrylimide resin compositions thus obtained are shown in Table 3. When the methyl methacrylate dimer was present in a large amount and when a single solvent was used, the discoloration of the resin composition under heating was substantial.

TABLE 2

|  | Methacrylate resin | Methyl metharylate dimer (ppm) | Solvents (weight ratio) | Resin solution Concentration | Resin solution Supply rate (kg/hr) | Imidizing agent Type | Imidizing agent Supply rate (mol/hr) | Transparency (total light transmittance) (%) |
|---|---|---|---|---|---|---|---|---|
| Example 30 | MMA polymer *13 | 30 | Xylene/methanol (80/20) | 50 | 2.0 | Methyl amine | 5.0 | 94 |
| Example 31 | MMA polymer *13 | " | Toluene/ethanol (90/10) | " | " | Methyl amine | " | 94 |
| Example 32 | MMA polymer *13 | " | Xylene/ethanol (80/20) | " | " | Methyl amine | " | 94 |
| Example 33 | MMA polymer *13 | " | Xylene/isopropanol (80/20) | " | " | Methyl amine | " | 94 |
| Example 34 | MMA polymer *13 | " | Toluene/isobutanol (70/30) | " | " | Methyl amine | " | 94 |

|  | Heat yellowness index YIs | Heat yellowness index Visual evaluation | Yellowness index of molded plate YIp | Heat distortion temperature (°C.) | Imidization rate (%) |
|---|---|---|---|---|---|
| Example 30 | 0.6 | O | 0.9 | 153 | 63 |
| Example 31 | 0.5 | O | 0.8 | 155 | 65 |
| Example 32 | 0.6 | O | 0.9 | 156 | 66 |
| Example 33 | 0.5 | O | 0.8 | 156 | 66 |
| Example 34 | 0.5 | O | 0.8 | 156 | 66 |

*13 Same as used in Example 1

TABLE 3

|  | Methyl | Solvents | Resin solution Supply | Imidizing agent Supply | Transparency (total light |
|---|---|---|---|---|---|

TABLE 3-continued

| Comparative Example | Methacrylate resin | metharylate dimer (ppm) | (weight ratio) | Concentration | rate (kg/hr) | Type | rate (mol/hr) | transmittance (%) |
|---|---|---|---|---|---|---|---|---|
| 1 | MMA polymer *14 | 2,500 | Toluene/methanol (90/10) | 30 | 2.7 | Methyl amine | 20 | 89 |
| 2 | MMA polymer *14 | 1,900 | Toluene/methanol (90/10) | " | " | Methyl amine | " | 90 |
| 3 | MMA polymer *14 | 1,730 | Toluene/methanol (90/10) | " | " | Methyl amine | " | 90 |
| 4 | MMA polymer *14 | 1,030 | Toluene/methanol (90/10) | " | " | Methyl amine | " | 90 |
| 5 | MMA polymer *15 | 1,500 | Toluene/methanol (90/10) | 50 | 2.0 | Methyl amine | 0.15 | 90 |
| 6 | MMA polymer *15 | 1,500 | Toluene/methanol (90/10) | " | " | Methyl amine | 1.0 | 90 |
| 7 | MMA polymer *15 | 1,500 | Toluene/methanol (90/10) | " | " | Methyl amine | 5.0 | 90 |
| 8 | MMA polymer *15 | 1,500 | Toluene/methanol (90/10) | " | " | Methyl amine | 10 | 90 |
| 9 | MMA polymer *16 | 30 | Toluene | " | " | Methyl amine | 5.0 | 91 |
| 10 | MMA polymer *16 | " | Xylene | " | " | Methyl amine | " | 89 |
| 11 | MMA polymer *16 | " | Methanol | " | " | Methyl amine | " | 88 |

| | Heat yellowness index | | Yellowness index of molded plate YIp | Heat distortion temperature (°C.) | Imidization rate (%) |
|---|---|---|---|---|---|
| Comparative Example | YIs | Visual evaluation | | | |
| 1 | 10.0 | X | 6.5 | 175 | 97 |
| 2 | 7.0 | X | 4.5 | 176 | 98 |
| 3 | 6.0 | X | 6.2 | 176 | 98 |
| 4 | 3.4 | Δ | 4.4 | 176 | 98 |
| 5 | 5.0 | X | 4.5 | 114 | 11 |
| 6 | 5.1 | X | 5.5 | 135 | 46 |
| 7 | 5.2 | X | 5.7 | 154 | 64 |
| 8 | 5.3 | X | 6.0 | 163 | 73 |
| 9 | 8.8 | X | 12.1 | 143 | 64 |
| 10 | 9.7 | X | 13.9 | 140 | 63 |
| 11 | 10.3 | X | 15.0 | 139 | 60 |

*14: Methyl methacrylate polymer (intrinsic viscosity: 0.56 dl/g)
*15: Methyl methacrylate polymer (intrinsic viscosity: 0.51 dl/g)
*16: Same as used in Example 1

According to the process of the present invention, the imidizing reaction can easily be controlled, and it is thereby possible to industrially advantageouly produce a methacrylimide resin composition having excellent quality. Further, the methacrylimide resin composition thereby obtained is superior in the transparency, heat resistance and heat discoloration resistance. Therefore, it is useful in a wide range of fields wherein such properties are required, for example, in the fields of CRT filters, TV filters, fluorecent tube filters, liquid crystal filters, meters, display devices such as digital display boards, illumination and optics, head light cover electric parts for atomobiles or for core or sheath materials for optical fibers.

We claim:

1. A methacrylate resin composition comprising a methacrylate resin containing methacrylimide units of the following formula:

wherein R is a hydrogen atom or an aliphatic, alicyclic or aromatic hydrocarbon group having from 1 to 20 carbon atoms, said composition having a yellowness index (YIs) of at most 3 as measured in the form of a solution of the heated resin composition and a total light transmittance of from 89 to 95%.

2. The methacrylate resin composition according to claim 1, wherein the yellowness index (YIs) as measured in the form of the heated resin composition is from 0.1 to 1, and the total light transmittance is from 92 to 94%.

3. A methacrylate resin composition comprising a methacrylate resin containing methacrylimide units of the following formula:

wherein R is a hydrogen atom or an aliphatic, alicyclic or aromatic hydrocarbon group having from 1 to 20 carbon atoms, said composition having a yellowness index (YIp) of at most 2.7 as measured in the form of a molded plate and a total light transmittance of from 89 to 95%.

4. The methacrylate resin composition according to claim 3, wherein the yellowness index (YIp) as measured in the form of a molded plate is from 0.2 to 1.5, and the total light transmittance is from 92 to 94%.

5. A methacrylate resin composition comprising a methacrylate resin containing methacrylimide units of the following formula:

wherein R is a hydrogen atom or an aliphatic, alicyclic or aromatic hydrocarbon group having from 1 to 20 carbon atoms, said composition having a yellowness index (YIs) of at most 3 as measured in the form of a solution of the heated resin composition, a yellowness index (YIp) of at most 2.7 as measured in the form of a molded plate and a total light transmittance of from 89 to 95%.

6. The methacrylate resin composition according to claim 5, wherein the yellowness index (YIs) as measured in the form of the heated resin composition is from 0.1 to 1, the yellowness index (YIp) as measured in the form of a molded plate is from 0.2 to 1.5, and the total light transmittance is from 92 to 94%.

7. A process for preparing a methacrylate resin composition comprising a methacrylate resin containing methacrylimide units of the following formula:

wherein R is a hydrogen atom or an aliphatic, alicyclic or aromatic hydrocarbon group having from 1 to 20 carbon atoms, which comprises reacting a resin comprising methyl methacrylate units as the main constituent units and having a methyl methacrylate dimer content of not higher than 1,000 ppm, with an amine of the formula $RNH_2$ wherein R is as defined above, under a condition such that said resin is dissolved in a solvent mixture for the resin.

8. The process for preparing a methacrylic resin composition according to claim 7, wherein the methyl methacrylate dimer content in the resin comprising methyl methacrylate units as the main constituent units, is not higher than 250 ppm.

9. The process for preparing a methacrylate resin composition according to claim 7, wherein the solvent mixture for the resin is a mixture of benzene, toluene, xylene or a mixture thereof, and an aliphatic alcohol.

10. The process for preparing a methacrylate resin composition according to claim 7, wherein the proportions of (1) the resin, (2) benzene, toluene, xylene or a mixture thereof in the solvent mixture and (3) the aliphatic alcohol in the solvent mixture, are from 5 to 80 parts by weight, from 19 to 94 parts by weight and from 1 to 76 parts by weight, respectively (relative to the total of 100 parts by weight).

11. The process for preparing a methacrylate resin composition according to claim 9, wherein the aliphatic alcohol is methyl alcohol, ethyl alcohol, propyl alcohol, isopropyl alcohol, butyl alcohol or isobutyl alcohol.

12. A methacrylate resin composition comprising a methacrylate resin containing methacrylimide units of the following formula:

wherein R is a hydrogen atom or an aliphatic, alicyclic or aromatic hydrocarbon group having from 1 to 20 carbon atoms, said composition having a yellowness index (YIs) of at most 3 as measured in the form of a solution of the heated resin composition and a total light transmittance of from 89 to 95%, said composition being produced by dissolving a resin comprising methylmethacrylate having a dimer content of not higher than 1000 ppm in a solvent mixture and reacting the dissolved resin with an amine of the formula $RNH_2$, wherein R is as defined above.

13. The methacrylate resin composition according to claim 12, wherein the solvent mixture comprises at least one material selected from the group consisting of benzene, toluene and xylene, and an aliphatic alcohol.

14. The methacrylate resin composition according to claim 12, wherein from 5 to 80 parts by weight of the resin are dissolved in the solvent mixture which comprises 19 to 94 parts by weight of said material selected from the group consisting of benzene, toluene and xylene, and from 1 to 76 parts by weight of said aliphatic alcohol, and wherein the resin and the solvent mixture together make up a total of 100 parts by weight.

15. The methacrylate resin composition according to claim 12, wherein the aliphatic alcohol is selected from the group consisting of methyl alcohol, ethyl alcohol, n-propyl alcohol, isopropyl alcohol, n-butyl alcohol and isobutyl alcohol.

* * * * *

UNITED STATES PATENT AND TRADEMARK OFFICE
CERTIFICATE OF CORRECTION

PATENT NO. : 4,745,159

DATED : May 17, 1988

INVENTOR(S) : Anzai et al.

It is certified that error appears in the above-identified patent and that said Letters Patent is hereby corrected as shown below:

Title page:   2nd col., following the 7th line, insert:

--OTHER PUBLICATIONS
  Chem. Abstracts, Vol. 67, 1967,
  74114v, Roehm & Haas--.

Signed and Sealed this

Seventeenth Day of October, 1989

Attest:

DONALD J. QUIGG

Attesting Officer

Commissioner of Patents and Trademarks